United States Patent [19]

Helmich

[11] Patent Number: 4,894,123
[45] Date of Patent: Jan. 16, 1990

[54] HIGH EFFICIENCY WATER DISTILLER

[76] Inventor: Arthur R. Helmich, Rte. 5, Box 5150, Benton, Ark. 72015-9525

[21] Appl. No.: 265,587

[22] Filed: Nov. 1, 1988

[51] Int. Cl.$^4$ .............................................. B01D 3/02
[52] U.S. Cl. ................... 202/176; 137/403; 159/23; 159/DIG. 32; 159/DIG. 41; 202/181; 202/185.3; 202/235; 202/254; 203/4; 203/10; 203/12; 203/22; 203/100; 203/DIG. 8
[58] Field of Search ............ 202/176, 181, 185.3, 202/197, 235, 254; 203/100, 4, 10, 40, 12, 221, DIG. 8; 159/DIG. 32, DIG. 41, 23; 137/403

[56] References Cited

U.S. PATENT DOCUMENTS

| | | | |
|---|---|---|---|
| 473,164 | 4/1892 | Rochlitz | 202/185.3 |
| 1,362,666 | 12/1920 | Badger | 203/10 |
| 1,544,029 | 6/1925 | Nelson | 200/10 |
| 3,029,068 | 4/1962 | Skow | 203/DIG. 17 |
| 3,058,485 | 10/1962 | McQueen | 137/403 |
| 3,345,271 | 10/1967 | Shay et al. | 203/10 |
| 3,401,091 | 9/1968 | Gidner | 202/176 |
| 3,444,056 | 5/1969 | Sundquist | 203/10 |
| 3,558,436 | 1/1971 | Foley et al. | 203/10 |
| 3,660,246 | 5/1972 | Smith | 203/10 |
| 3,696,003 | 10/1972 | Fitch et al. | 202/176 |
| 3,907,683 | 9/1975 | Gilmont | 202/176 |
| 4,094,327 | 6/1978 | Brandelli | 137/403 |
| 4,239,601 | 12/1980 | Lemoine | 202/176 |
| 4,269,663 | 5/1981 | McFee | 202/185.3 |
| 4,331,514 | 5/1982 | Bauer | 202/185.3 |
| 4,579,629 | 4/1986 | Kanbier et al. | 203/100 |
| 4,612,090 | 9/1986 | Ellis, Jr. | 202/176 |
| 4,696,718 | 9/1987 | Lasater | 202/176 |
| 4,724,048 | 2/1988 | Helmich | 202/176 |

Primary Examiner—Virginia Manoharan
Attorney, Agent, or Firm—Browning, Bushman, Zamecki & Anderson

[57] ABSTRACT

A highly efficient distillation unit is provided for heating water and condensing the generated steam to remove the contaminants from the water. Efficiency is enhanced by providing a compact air cooled fin-and-tube heat exchanger which removes heat from the steam, with a powered blower passing air by the fins. A removable bowl which houses the evaporating water is suspended from a rod biased toward its upper position. Mechanical linkage interconnects the rod and a valve which controls incoming water flow to the bowl. The valve closure member is incrementally moved from an opened position to a closed position as a function of the weight of the water in the heating bowl. A low density electrical heating element is powered with from 40 to 55 watts per square inch of submerged heating element exterior surface. The bowl is configured to have a large surface area of heated water to heater input power, thereby further maximizing efficiency. The unit of the present invention is particularly well suited for home or office use, and may be easily cleaned and economically operated.

19 Claims, 2 Drawing Sheets

HIGH EFFICIENCY WATER DISTILLER

BACKGROUND OF THE INVENTION

1. Field of the Invention

The present invention relates to apparatus for distilling water to remove contaminants and, more particularly, relates to a highly efficient water distiller suitable for home or office use.

2. Description of the Background

Water distillers have been used for decades to purify water. Water distillation provides an effective and highly efficient technique for removing bacteria, chemicals, and toxic organic compounds from contaminated water. In recent years, the public has become more aware of the fact that regular water supplies, including "tap" water supplied by a municipality and local or regional well water, often contains dissolved gases, e.g., sulfur dioxide, and/or other contaminants which are harmful to health. The distillation process heats the water to produce steam, and then condenses the steam to form water free from such contaminants. The contaminants having a vaporization temperature higher than that of water remain in the heating unit of the distiller, while solvents which have a boiling point lower than water may be separated from the steam by venting prior to condensation.

U.S. Pat. No. 771,832 discloses a crude water distiller with a bunsen burner for heating the water. U.S. Pat. No. 3,445,344 discloses a complex distiller with a pump having a rotating inverted open cone. U.S. Pat. No. 3,489,649 discloses a distiller with two separate boiling chambers for achieving double distillation.

U.S. Pat. No. 3,660,246 discloses a distiller with a vertical riser between a distillation chamber and a condensation chamber. The distillate enters an expansion zone and exits through perforations, where it is cooled by a spiral cooling coil. U.S. Pat. No. 3,907,683 discloses a distiller with a constant head reflux condenser to closely regulate the temperature and flow rate of the water from the condenser to the evaporator. U.S. Pat. No. 4,110,170 discloses a condenser which controls the entry of water to the distiller by sensing the temperature of the distillate.

U.S. Pat. No. 3,838,016 teaches a distiller which utilizes spiral condenser coils. A first float is responsive to the water level in the heating unit, and a second float is responsive to the water level in the condensing unit. Each float operates a microswitch, and the signals from each of the floats operates the distiller. U.S. Pat. No. 4,331,514 discloses a distiller with a float valve which regulates the level of water in a boiling chamber. U.S. Pat. No. 4,339,307 discloses a distiller with separate float valves for controlling the water level in a preheat unit and the boiler unit.

An improved water distiller is disclosed in U.S. Pat. No. 4,724,048. This water distiller includes a substantially vertical chimney for passing steam from the heating unit to the condensing unit, and a inner tube axially positioned within the chimney for passing preheated water to the heating unit. In one embodiment, the distiller includes an air-cooled condenser with a blower for removing heat from the condensing steam.

In spite of all the attempts to devise an improved distiller, prior art distillers for home use nevertheless have significant disadvantages which have limited their acceptance. The distillers have generally been considered too costly to operate, since a relatively high wattage is required to produce purified water. Although prior art distiller units advertise that eleven gallons of distilled water per 24 hours is available from a unit operating at 1200 watts, this efficiency is difficult to obtain and more difficult to maintain. Moreover, many lesser priced units cannot even achieve this efficiency.

A further disadvantage of prior art distillers relates to the difficulty with cleaning distillers having floats for sensing water levels and thereby regulating the flow of water to the distiller. Such floats are subject to collecting scale and other debris, and do not maintain the water level in the heating unit of the distiller at a constant value.

The disadvantages of the prior art are overcome by the present invention, and an improved home distiller is hereinafter disclosed which has a high efficiency compared to prior art distillers for producing distilled water.

SUMMARY OF THE INVENTION

A distillation unit of the present invention has several significant advantages compared to prior art units. The distiller preferably utilizes a vertical steam chimney extending upward from the heating bowl, and an internally positioned water chimney for preheating water to the heating bowl. The preheat unit further includes a steam receiving bowl and an interiorly positioned incoming water bowl, which together remove heat from the steam before reaching the condensate unit, and preheat water to the heating bowl. The condensate unit preferably utilizes a parallelepiped fin and tube heat exchanger to minimize space requirements and efficiently remove heat from the steam to form the distillate. The design of the condenser unit further enables undesirable gases to be easily vented from the unit at various stages of the condensation process, without releasing significant amounts of steam and thus decreasing the efficiency.

The heating bowl is preferably suspended from a rod axially movable with respect to the enclosure and biased to its upward position. The heating bowl and rod thus move axially downward to overcome the biasing member in response to increased weight of water in the heating bowl. A valve which regulates the flow of incoming water is incrementally controlled between its open and closed positions as a function of the axial position of the bowl, thus closely regulating the flow of incoming water to the unit. In a preferred embodiment, a mechanical linkage is provided between the rod and a tapered closure member of the valve, such that the axial position of the closure member with respect to its surrounding seat incrementally regulates the flow of incoming water.

Efficiency is further increased by using a low density heating element which receives from 40 to 55 watts of electrical power per square inch of merged heating element surface area. The heating bowl is configured such that the surface area of the water in the heating bowl is high compared to the volume of water in the bowl, thereby reducing heat loss from the bowl. From 0.018 to 0.025 square inches of surface area for the submerged heating element is preferably used per watt of incoming electrical power to the heating element to maintain high efficiency.

It is an object of the present invention to provide a distillation unit with a high efficiency of condensate per electrical power to the heating element.

A feature of the present invention is an improved preheating unit for efficiently removing heat from the steam and preheating water to the heating unit. The distillation apparatus utilizes a low density heating element and a fin and tube heat exchanger to improve efficiency. As a further feature of the invention, a valve for controlling incoming water is incrementally regulated between its open and closed positions as a function of the weight of the water in the heating bowl.

An advantage of the present invention is the simplicity yet high efficiency of the unit, thereby making the unit well suited for home or office use. The unit may be easily cleaned and maintained, since a water level float is not used to control incoming water to the unit.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 1:
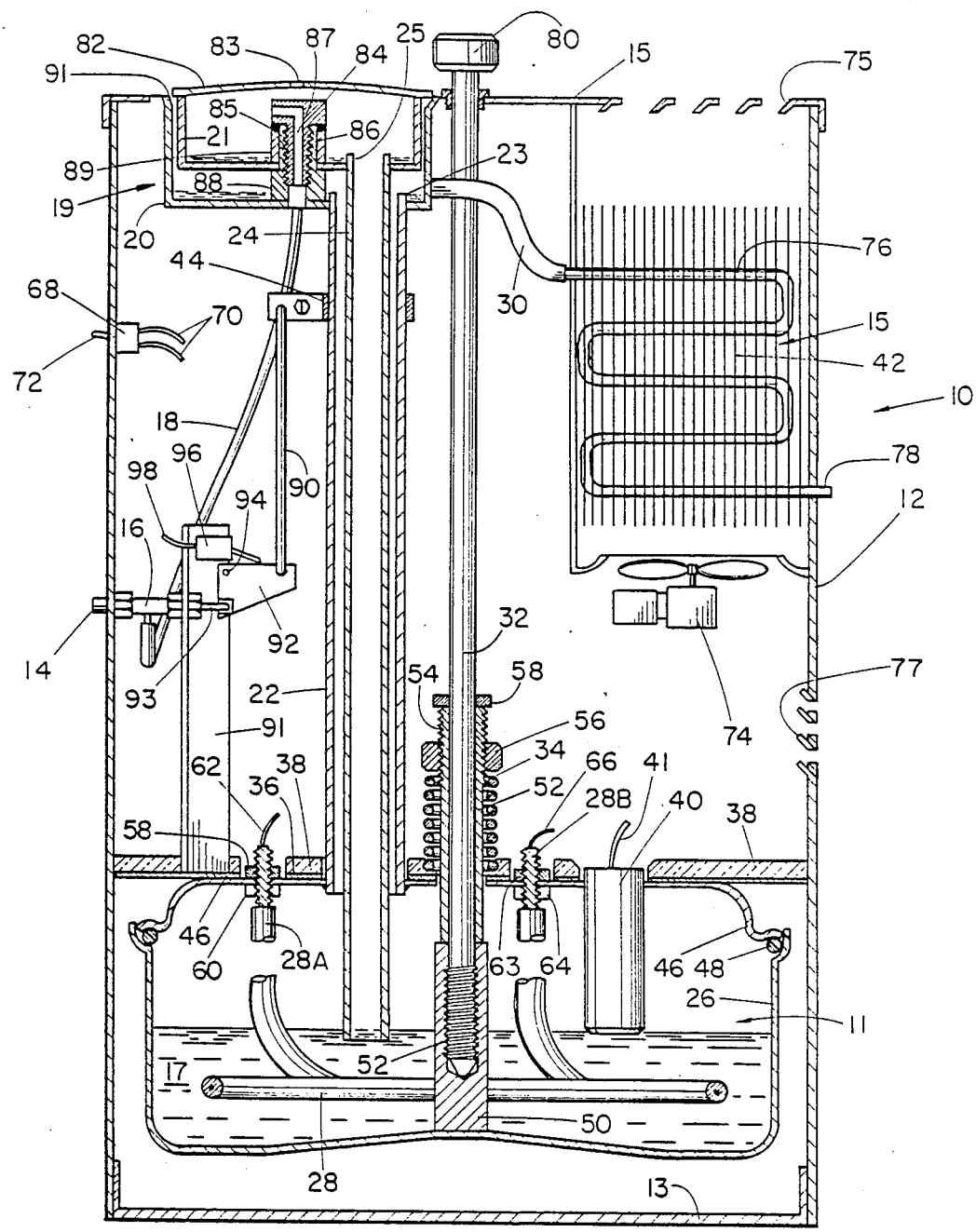
FIG. 1 is a pictorial view, partially in cross-section, of a distillation unit according to the present invention.

Referring to FIG. 1, a suitable embodiment of the distiller unit 10 according to the present invention is shown. The unit as shown in FIG. 1 is well suited for home or office use, and receives contaminated water and produces distilled water at a high efficiency per watt of input power to the unit. Unit 10 comprises an enclosure 12 formed from sheet metal, has planar sides and a base 13 affixed thereto, and a removable cover 15.

Contaminated water, e.g., tap water, flows to the unit via line 14, and the flow rate is incrementally controlled by valve 16, which releases water via line 18 to preheat unit 19. Unit 19 comprises a steam receiving bowl 20 having a substantially planar base and cylindrical sides, and a incoming water bowl 21 positioned within the interior of bowl 20 and having a similarly shaped base and sides.

A substantially vertical chimney 22 extends from the interior cavity between bowls 20 and 21 to the interior of the evaporation unit 11. The upper portion of the chimney 22 forms a lip 23 which projects slightly above (typically less than ¼ inch) the base of bowl 20, so that any condensate in bowl 20 will flow by gravity through line 30 to the condenser unit 15 rather than returning to the evaporation unit 11. Water chimney 20 is axially positioned within the chimney 22, and has a similar upper portion 25 above the base of bowl 21. Lip 25 maintains a low level of water in the bowl 21 (lip 25 is also typically less than ¼ inch above the lower planar surface of bowl 21), and water overflowing lip 25 flows along the interior surface of the chimney 24 to the evaporation unit 11. The lower end of the chimney 24 is below the surface of the water 17 in the evaporation unit 11, so that steam cannot rise through the chimney 24.

A spacer portion 88 integrally formed on connection 86 maintains the lower planar surface of the incoming water bowl 21 a fixed distance above the steam receiving bowl 20. Only a slight gap is provided between the cylindrical sides of the bowls 20 and 21 to let undesirable gases mixed with the steam (the gases being lighter than the steam) rise upward in this annular gap between the bowls and thus pass out between the upper lips of the bowls 20 and 21. If desired, a small vent port 91 may be provided in the lip of bowl 21 to better allow light gases to vent from bowl 20. Also, a cover 82 is provided over the bowls 20 and 21 to reduce heat loss, but the cover is not sealed to the bowls. A small diameter opening 83 may be provided in the cover to let gases pass out the bowl 21 as water in the bowl is preheated before entering the evaporation unit 11.

Incoming water thus passes via the flexible line 18 to connection 86, which has a central passage therein. A nut 84 is threaded to connection 86, so that a sealed flow path is provided between line 18 and flow passage 87 in the nut 84. Passage 87 preferably discharges water into the bowl 21 in a horizontal direction, so that incoming water does not engage cover 82. An O-ring seal 85 seals nut 84 with both connection 86 and riser 89, so that discharged water is prevented from entering bowl 20, while steam is prevented from passing into bowl 21.

Evaporation unit 11 comprises a heating bowl 26 with cylindrical sides and a convex bottom 27 for increased strength. A low density electrical heating coil 28 is provided within the bowl 26. One end 28A of the coil 28 extends through and is secured to the cover 46 of the evaporation unit by nuts 58 and 60, while the other end 28B is similarly affixed to the cover by nuts 63 and 64. Electrical power from lines 62 and 66 thus heats the coil 28, which in turn heats and vaporizes the water 15. Cover 46 is sealed to bowl 26 by O-ring 48. A latching mechanism (not shown) normally secures the bowl 26 to the cover 46, while allowing the bowl to be separated from the cover so that it can easily be removed from the enclosure 12 for cleaning.

A cylindrical rod 32 extends from above the cover 15 to the evaporation unit 11, and is secured by threads 52 to projection 50 weldably fixed to the center of the bowl 26. A spacer 52 is provided along the rod 32 and in engagement with the projection 50, and has threads 54 at its upper ends for receiving nut 56. Collar 58 is affixed to the rod 32, such that the spacer 52 is normally sandwiched between 50 and 58. A coil spring 34 is provided radially outward of the spacer 52, and is sandwiched between the nut 56 and the horizontal intermediate plate 36 secured to the sides of the enclosure 12. An insulation material 38 is provided on top of intermediate plate 36 for reducing the heat loss from the evaporation unit 11. A plurality of circular holes are provided through the intermediate plate 36 and the insulation 38, as shown, for receiving the ends 28A and 28B of the heating coil, a sensor 40 secured to the cover 58, and spacer 52 and rod 32. Sensor 40 generates an electrical shut-off signal transmitted through line 41 to electronics 68 to automatically discontinue power to the heating coil if a temperature of the water in the evaporation unit 11 rises to above a selected limit.

As water evaporates from the bowl 26, the coil spring 34 forces the cover 46 of the evaporation unit toward engagement with the intermediate surface 58. Although FIG. 1 depicts the cover in actual engagement with the intermediate plate 36, it should be understood that the cover and plate are normally slightly separated during operation of the distiller unit. As additional water is fed into the evaporation unit, this further weight of the water in the bowl 26 causes the rod 32 to move downwardly with respect to the enclosure 12, thereby compressing the spring 34. This same downward movement of the rod 32 causes downward movement of the chimneys 22 and 24, and the bowls 20 and 21 respectively affixed thereto.

Arm 44 is secured to chimney 22, and angle support 91 is affixed to the intermediate plate 36. Rod 90 is connected at one end to arm 44 and at the other end to plate 92. Plate 92 pivots at 94 with respect to support 91. Thus, vertical movement of the rod 32 causes the plunger stem 93 of the valve 16 to move axially inward or outward with respect to the body of the valve 16, thereby incrementally controlling the flow of water to the unit 10. A microswitch 96 is responsive to the movement of the pivot plate 92, and sends a signal via line 98 to the electronics 68 to terminate power to the coil 28 if the plate 92 rotates outside of selected limits. As previously indicated, electronics 68 automatically controls operation of the unit 11, and has one or more switches 72 to manually turn on or off electrical power to the coil 28, or to operate the blower 74. A plurality of wires 70 extend from the electronics 68, and are thus connected to the switch 96, the sensor 40, and the blower 14.

A condenser unit 15 comprises a fin-and-tube heat exchanger, with one or more tubes 76 each connected to a plurality of spaced fins 42. Distillate is thus discharged from the unit through the outlet line 78. The fins 42 of the unit 15 define the general configuration of the condenser, since the tubes 76 pass through the spaced fins. According to the present invention, the fins 42 define a parallelepiped configuration, thereby obtaining the benefits of a highly efficient yet compact condenser. As previously indicated, blower 74 forces air upward through the fins 42, with air incoming to the interior of the unit 12 through slots 77 in one or more sides of the enclosure, and leaving through slot 75 in the cover 15.

Figure 2:
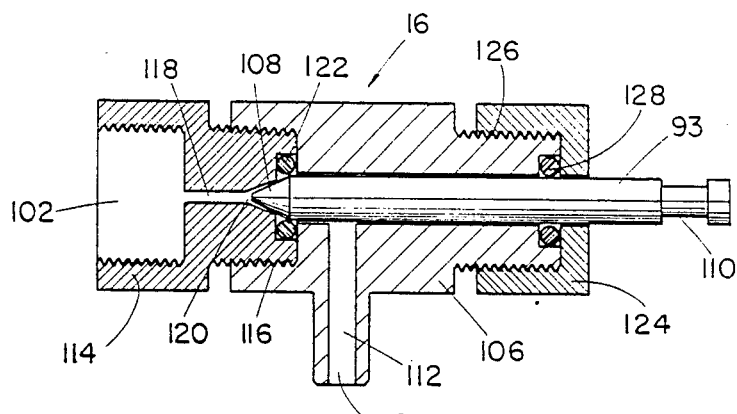
FIG. 2 is a cross-sectional view of a valve for controlling incoming water to the unit generally shown in FIG. 1.

The valve depicted in FIG. 1 is shown in greater detail in FIG. 2. The valve 16 includes an inlet 102 in fluid communication with line 14, and an outlet 104 in fluid communication with flexible line 18. The body 106 has an elongate passageway generally filled with a pin-like closure member 93 having an elongate conical sealing surface 108 at one end, and a recess portion 110 at the opposing end adapted for engagement with the pivot plate 92. The body 106 of the valve has an outlet passageway 112 generally perpendicular to the central axis of the closure member 93. Tip 114 is provided with threads 116 for engagement with body 106, and has a central passageway 118 generally aligned with the closure member. A conical-shaped cavity 120 is provided within the tip 114 for receiving the conical sealing surface 108 when the valve is in its fully closed position. An O-ring seal 122 provides fluid tight sealing between the closure member 93 and the tip 114 when the closure member is in the fully closed position as shown. The closure member may incrementally move away from the tip 114, however, and incremental movement of the closure member will closely regulate and incrementally change in a corresponding manner the flow of water through the valve. Thus the flow rate of water through the valve depends upon the incremental axial position of the closure member 93, which in turn depends upon the axial position of the rod 32. Cap 124 is threaded to the body at 126, and has an opening for receiving the end of the closure member, as shown. Seal 128 continually seals between the closure member 93 and the body 106.

The valve 16 as shown in FIG. 2 thus incrementally controls the flow of water to the bowl 21, and thus to the evaporation unit 11. It should be understood that this water flow is at a very slow rate, typically in the range of less than one gallon per hour. The valve 16 thus effectively allows the regulated "dripping" of water to the preheat unit so that no significant temperature fluctuations occur in the water within the bowl 21, thereby increasing efficiency. The valve 16 is thus controlled by the action of the adjustable biasing member 34, and the weight of the water in the bowl 26. Regulation of the valve 16 can be effectively controlled by rotating the nut 56.

Normal operation of the unit as shown in FIG. 1 will now be briefly described. Incoming water is controlled by valve 16, which as described above is responsive to the weight of the water in the heating bowl 26. As the level of water in bowl 26 rises, the increased weight compresses spring 34, causing chimney 22 to move downward and moving the stem 93 inward, thereby slowing closing off the flow of incoming water. The result of this action is that water effective "drips" into the bowl 21 and down the chimney 24 and to bowl 26, thereby preventing significant temperature variations of the water in the bowl during normal use of the unit.

Incoming water in bowl 21 will be contained at a relatively low level, e.g., ⅛th of an inch or less, before it passes over the lip 25 and down the inner walls of the chimney 24. The water in bowl 21 will be preheated by steaming bowl 20, and undesirable gases will vaporize and pass out of the hole 83 in the lid 82. Water passing down the chimney 24 will also be further heated as it passes to the bowl 26 by steam in the chimney 22.

The water in bowl 26 is heated by electrical heating element 28, and the formed steam passes up the chimney 22 to bowl 20. While in bowl 20, some of the steam condenses as the water in the bowl 21 is heated, and this condensate flows by line 30 to the condenser unit 15. Lip 23 thus prevents condensate in the bowl 23 from returning to the heating bowl 26, thereby improving efficiency. Also, it should be noted that the side of the bowl 21 is heated by steam in bowl 20. Gases mixed with the steam in bowl 20 are vented, since the upper edges of the bowls 20 and 21 are not in sealing engagement. Alternatively, a small vent passage 91 may be provided in the lip of bowl 21 to ensure that undesirable gases will be easily vented from the bowl 20.

Most of the formed steam will condense in the condenser unit 15 as it passes through the tubes 76. The blower 74 will normally be powered to pass air by the fins 42, thereby cooling the fins and thus the tubes 76. Condensate free from contamination will pass out line 78 to the holding tank (not shown). As explained in further detail below, additional gases may be vented from the condensate unit 15 at various stages along the length of the tubes 76.

In order to clean the unit, the operator may actuate one of the switches 72 to turn off all electrical power to the unit. A side door (not shown) on the closure 12 may be opened to give access to the heating bowl 26. The operator may then rotate knob 80 affixed to the top of rod 32, thereby unthreading the rod from element 50. Bowl 26 may then be unlatched from the cover 46, and easily removed from the unit to clean sediment in the bottom of the bowl. The lid 23 may also be removed, the nut 84 unthreaded from 86, and the bowl 21 and chimney 24 removed by merely lifting these components upwardly. The inside of the bowl 21 and the interior walls of the chimney 24 may include some scale, which can be easily cleaned with a brush. The chimney 22 and bowl 20 may remain fixed to the cover 46, since scale will not appreciably form on these components. The cleaned components may then be reinstalled into the unit, and power returned to the unit to continue the distillation process.

The desired level of water in the heating bowl 26 may be effectively controlled by rotating the nut 56 to increase or decrease the biasing force of the spring 34. In general, however, the water level in bowl 26 should be maintained at a relatively low level of 2 inches or less, thereby decreasing heat loss from the sides of the bowl. If the water level in the bowl were to fall to a level so low that the heating element 28 were not safely submerged, the spring 34 would raise the cover 46 toward the intermediate shelf 36. This action would trip switch 96, thereby automatically terminating electrical power to the element 28. As a further safety precaution, temperature sensor 40 may also be used to terminate power to the unit if its tip is not submerged in water. The fan 74 may be powered only in the summer months, if desired, since the fins 42 may sufficiently cool the tubes 76 during the winter months to cause the desired condensation without forcing air between the fins.

The electrical heating element 28 is a low density heating element which has a large surface area submerged in the water within the bowl 26 per watt of electrical power to the heating element. This low density design ensures that "pockets" of water in the bowl 26 are not overheated to cause agitated "bubbling" of the water, which adversely affect efficiency. Preferably, the heating element causes steam to rise uniformly from the surface of the water. It has been determined that the heating element with approximately 25 square inches of submerged exterior surface should be powered with from 800 to 1450 watts, and preferably from 1000 to 1375 watts of electrical power to maintain the desired efficiency. In other words, the heating element preferably is powered with from 40 to 55 watts per square inch of submerged electrical heating element surface to maintain high efficiency. Stated differently, the surface of the heating element should be in the range of from 0.018 to 0.025 square inches per watt of electrical power. This low density of power to the heating element is a substantial departure from currently available home distillation units, and is a significant contribution to the increased efficiency of the unit.

In addition to maintaining a relatively low level of water in the heating bowl 26 to reduce heat loss, it is also preferably to have a high surface area of water in the heating bowl per unit of electrical power to the evaporator unit 11. The surface area of the water in the heated bowl is preferably from 1.7 to 2.3 times the surface area of the submerged electrical heating element. Moreover, the surface area of the bowl in contact with the heated water is preferably less than 2.5, and preferably in the change of from 1.8 to 2.2, times the surface area of the submerged heating element.

According to the present invention, a distillation unit powered with from 1000 to 1375 watts to the element 28 preferably has approximately 50 square inches of water surface area in the heating bowl. Accordingly, the submerged electrical heating element is powered with from 20 to 27.5 watts per square inch of surface area for the water in the heating bowl. The bowl is thus configured so that from 0.036 to 0.050 square inches of water surface area is provided per watt of power to the electrical heating element.

Figure 3:
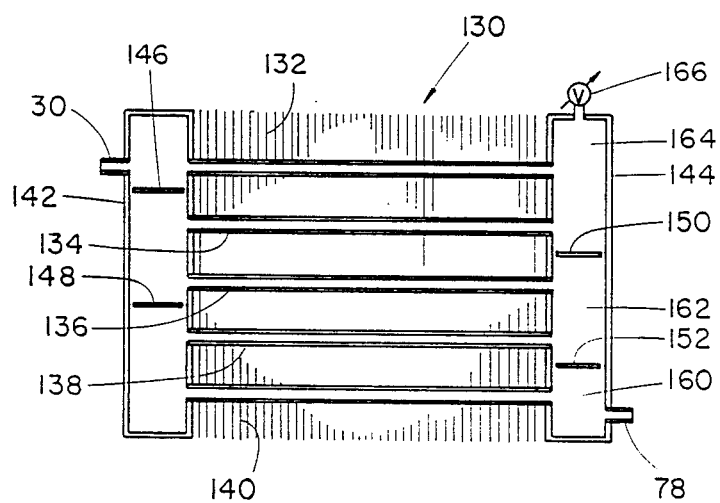
FIG. 3 is a cross-sectional view of an alternate embodiment of a condensing unit according to the present invention.

FIG. 3 depicts an alternate embodiment of a condensation unit generally shown in FIG. 1. A plurality of tubes are arranged in rows and columns, and a header is provided at the end of the tubes for allowing an exchange of fluid between parallel tubes. Thus the condenser unit 130 includes four horizontal tubes 132 each in parallel (literally and in a fluid sense), four similar tubes 134, four similar tubes 136, four similar tubes 138, and four similar tubes 140. A header assembly 142 is provided at one end of each of the tubes, and a corresponding header assembly 144 is provided at the other end of the tubes. Steam thus enters the header 142 through line 30, and condensate exits the unit through header 144 and line 78.

Steam enters the header 142 and passes (to the right as shown in FIG. 3) through one of the four tubes 132 to the header 144, and then back to the left through any one of the four tubes 134. Baffles 146 and 148 in the header 142, and similar baffles 150 and 152 in the header 154, thus control the back and forth flow of steam through each of the sets of four tubes. Although substantially all of the steam flows back and forth between the tubes and thus downward through the headers 142 and 144, each of the baffles may be connected to the side walls of the headers 142 and 144 by spot welding, so that a slight gap allows some fluid communication between different chambers in each header. It should thus be understood that a small amount of steam may pass from chamber 160 in header 144 to chamber 162, and from chamber 162 to chamber 164. This minute passage of steam is not desirable, but more importantly allows for the movement of undesirable light gases to move upward in each header unit during the condensation process. These undesirable gases may ultimately escape through the adjustable vent valve 166 at the upper end of one or both of the headers.

The condensation unit as shown in FIG. 3 also has a generally parallelepiped configuration, thereby minimizing space requirements. The use of the headers 142 and 144 at the end of each of the plurality of tubes allows for the intermixing of steam passing through each of the "layers" of tubes, and lets steam in the first "row" of the tubes 130 intermix within the chamber 164 and pass through the second, third, or fourth row of tubes 134. This feature desirably allows for the convenient release of gases at various stages in the condensation process by allowing the gases to move upwards in each of the header tubes, then ultimately be released from the condensation unit. The regulatable valve 166 may be closely controlled so that a very small amount of steam ultimately exits the valve 166, while a relatively large amount of undesirable gases are allowed to exit the condensation unit.

The design of the condensation unit 130 thus effectively allows for the venting of gases at multiple stages along the condensation tubes, although only the expense of one vent valve 166 is necessary. Moreover, this substantially reduces the complexity of operating the unit while maintaining high efficiency and high quality distillate, since multiple vent valves need not be adjusted. Each of the spaced fins 132 shown in FIG. 3 are preferably interconnected with one or more of each of the tubes 132 through 140, and preferably each of the fins are interconnected with all of the tubes 132 through 140. The design of the parallelepiped condensation unit as shown in FIG. 3 allows for very efficient condensation of the steam in a minimal amount of space, while also allowing "backflow" of condensation gases through the condensation unit to remove undesirable gases.

The distillation unit of the present invention can produce the same quantity of distilled water during a 24 hour period as other distillation units while operating at substantially less electrical power. While other units strive to obtain 11 gallons of distilled water per 24 hours of operating at 1700 watts, the unit of the present invention is able to obtain approximately 12 gallons of distilled water while operating at 1000 watts. Moreover, if the wattage is increased to approximately 1200 watts, the unit of the present invention can obtain in excess of 14 gallons of distilled water per 24 hours, and almost 17 gallons of distilled water in this time period can be obtained for the unit operating at 1375 watts. Moreover, the unit remains easily cleaned and maintained, as previously described.

It should be understood that various modifications to the distillation units described herein may be made without departing from the spirit of the present invention. Preferably gases are vented from the unit as the water is heated, gases are vented from the steam in the preheat unit, and gases are vented from the steam in the condensation unit. At each of these locations, light gas is preferably vented at a location other than adjacent a high velocity flow path of the steam. Although only one regulatable valve 166 is desired herein for controlling the release of gas from the condensation unit, it should be understood that a similar valve may be provided along the flow path of parts 83 or 91. The insulation material 38 may be provided, if desired, on the underside of the intermediate plate 32.

The foregoing disclosure and description of the invention is illustrative and explanatory thereof, and various changes in the design of the apparatus may be made within the scope of the appended claims without departing from the spirit of the invention.

What is claimed is:

1. A distillation apparatus for removing contaminants from water, the apparatus comprising:
    an outer enclosure including an incoming water inlet port and a condensed water outlet port;
    a preheat unit including (a) a steam receiving bowl for receiving steam from the evaporator unit, and (b) an incoming water bowl within the steam receiving bowl for removing heat from the steam to preheat water to the evaporator unit;
    a water inlet conduit for passing incoming water from the inlet port to the incoming water bowl;
    a valve for controlling the flow of incoming water through the water inlet conduit;
    an evaporation unit for heating incoming water with contaminants to generate steam, the evaporation unit including (a) a heating bowl disposed within the enclosure for housing the incoming water, (b) an electrical heating element positioned within the heating bowl, and (c) a first cover affixed within the enclosure and over the heating bowl;
    a substantially vertical steam chimney extending from the heating bowl, through the cover, and to the steam receiving bowl;
    a substantially vertical water chimney positioned within the vertical steam chimney for passing water from the incoming water bowl to the heating bowl while removing heat from the steam in the vertical steam chimney to heat the water passing through the water chimney; and
    a condenser unit for cooling the steam to form condensate water, the condenser unit comprising a fin-and-tube heat exchanger including (a) at least one tube in fluid communication at one end with the steam receiving bowl and in fluid communication at the opposite end to the condensed water outlet port for condensing steam to form condensate water, (b) a plurality of spaced fins each thermally connected to at least one tube for transmitting heat from at least one tube to the fins, and (c) a powered blower for blowing air between the fins and thus removing heat from the condenser unit.

2. The distillation apparatus as defined in claim 1, further comprising:
    a vent port from the steam receiving bowl for venting gases from the steam before the steam is passed to the condenser unit.

3. The distillation apparatus as defined in claim 1, wherein the incoming water bowl has a lower substantially planar surface, and has an overflow port to the vertical water chimney less than ¼ inch above the lower substantially planar surface for maintaining a low level of water in the incoming water bowl.

4. The distillation apparatus as defined in claim 1, wherein the steam receiving bowl has an outlet vertically above the tube for the condenser unit such that condensate formed in the steam receiving bowl will drain to the condenser unit.

5. The distillation apparatus as defined in claim 1, wherein the at least one tube comprises a plurality of tubes for passing steam in parallel, and wherein the condenser unit further comprises a plurality of headers spaced along the plurality of tubes for intermixing steam passing within the plurality of tubes and a vent port between the plurality of headers for venting gases from the steam passing through the plurality of tubes.

6. The distillation apparatus as defined in claim 1, wherein the outer enclosure further includes a second cover having an air outlet port, sidewalls having an air inlet port vertically below the cover, and wherein the powered blower is positioned below the plurality of fins.

7. The distillation apparatus as defined in claim 6, wherein the condenser unit has a parallelepiped configuration.

8. The distillation apparatus as defined in claim 1, wherein;
    the vertical steam chimney is movable within the outer steam chimney.

9. A distillation apparatus for removing contaminants from water, the apparatus comprising:
    an outer enclosure having an incoming water inlet port and a condensed water outlet port;
    evaporation means for heating incoming water to generate steam, the evaporation means including a heating bowl disposed to the enclosure for housing incoming water, heating means positioned within the heating bowl, and a cover within the enclosure and over the heating bowl;
    a condenser unit for cooling the steam to form condensate water;
    a rod axially movable within the enclosure and removably interconnected with the heating bowl, such that the heating bowl and interconnected rod move axially within the enclosure;

biasing means for biasing the rod and heating bowl axially toward an upper position; and valve means for controlling the flow of incoming water to the heating bowl, the valve means including a closure member incrementally positionable between a fully opened position and a fully closed position and movably responsive to the axial position of the rod, such that the weight of water in the heating bowl moves the rod toward a downward position overcoming the biasing means and incrementally closing the valve means.

10. The distillation apparatus as defined in claim 9, further comprising:

a mechanical linking means for interconnecting the valve closure member and the rod; and the valve means including an annular seat for sealing engagement with the closure member; and the closure member having a conical-shaped tip for fitting radially within and being axially movable with respect to the annular seat.

11. The distillation apparatus as defined in claim 9, wherein the heating bowl is suspended in the enclosure from the axially movable rod.

12. The distillation apparatus as defined in claim 11, wherein the heating bowl has a substantially vertical central axis, and wherein the rod is coaxial with the central axis of the heating bowl.

13. The distillation apparatus as defined in claim 9, wherein the rod is threadably interconnected to the heating bowl; and the rod passes through the cover over the heating bowl.

14. The distillation apparatus as defined in claim 10, further comprising:

a trip switch responsive to the linking means for terminating power to the heating means.

15. The distillation apparatus as defined in claim 10, further comprising:

a preheat unit including (a) a steam receiving bowl for receiving steam from the evaporation means, and (b) an incoming water bowl within the steam receiving bowl for removing heat from the steam to preheat the water to the evaporation means.

16. The distillation apparatus as defined in claim 9, wherein the heating means comprises an electrical heating element positioned within the heating bowl and having a surface area submerged under water in the heating bowl in a range of from 0.018 to 0.025 square inches per watt of electrical power to the heating element.

17. The distillation apparatus as defined in claim 16, wherein the heating bowl is configured such that the surface area of the water in the heating bowl is from 0.036 to 0.050 square inches per watt of power to the electrical heating 18. The distillation apparatus as defined in claim 16, wherein the heating bowl has a generally cylindrical configuration, and the surface area of the heating bowl in contact with the heated water is less than about 2.5 times the surface area of the electrical heating element submerged under water.

19. The distillation apparatus as defined in claim 9, wherein the heating bowl is configured such that the surface area of water in the heating bowl is maintained in the range of from 1.7 to 2.3 times the surface area of the submerged heating means.

* * * * *

UNITED STATES PATENT AND TRADEMARK OFFICE
CERTIFICATE OF CORRECTION

PATENT NO. : 4,894,123

DATED : January 16, 1990

INVENTOR(S) : Arthur R. Helmich

It is certified that error appears in the above-identified patent and that said Letters Patent is hereby corrected as shown below:

In Column 10, line 52, delete "steam chimney." and insert therefor --enclosure; and
  the valve is responsive to movement of the vertical steam chimney.--

In Column 12, line 23, after "heating" insert --element.--

Signed and Sealed this

Eleventh Day of December, 1990

Attest:

HARRY F. MANBECK, JR.

*Attesting Officer*   *Commissioner of Patents and Trademarks*